United States Patent [19]
Yasuhara et al.

[11] Patent Number: 4,471,652
[45] Date of Patent: Sep. 18, 1984

[54] POSITION DETECTOR FOR ROTARY ELEMENT SUCH AS AN INTERNAL COMBUSTION ENGINE CRANKSHAFT OR THE LIKE

[75] Inventors: Seishi Yasuhara; Hiroshi Kondo, both of Yokohama, Japan

[73] Assignee: Nissan Motor Company, Limited, Yokohama, Japan

[21] Appl. No.: 426,071

[22] Filed: Sep. 28, 1982

[30] Foreign Application Priority Data

Sep. 29, 1981 [JP] Japan ............................. 56-152989

[51] Int. Cl.³ .......................................... G01M 15/00
[52] U.S. Cl. ......................................... 73/116; 310/168
[58] Field of Search ................ 73/116; 324/174, 179; 310/168, 169, 170

[56] References Cited

U.S. PATENT DOCUMENTS 2,221,814 11/1940 Reid ................................... 310/170
3,132,337 5/1964 Martin .............................. 324/174 X
4,215,286 7/1980 Ornee ............................... 310/168 X

OTHER PUBLICATIONS

Japanese Utility Model Provisional Publication No. 51-85769/1976.

Primary Examiner—Jerry W. Myracle
Assistant Examiner—E. Harding
Attorney, Agent, or Firm—Lowe, King, Price & Becker

[57] ABSTRACT

A permanent magnet is mounted on a rotary member via a non-magnetic holder which magnetically and thermally insulates the magnet from the rotary member. This prolongs the life of the magnetic and obviates noise outputted by a stationary pickup which is excited by the magnet passing thereby.

13 Claims, 13 Drawing Figures

POSITION DETECTOR FOR ROTARY ELEMENT SUCH AS AN INTERNAL COMBUSTION ENGINE CRANKSHAFT OR THE LIKE

BACKGROUND OF THE INVENTION

1. Field of the Invention

The present invention relates generally to a position detector for a rotary element and more specifically to an improved arrangement wherein noise may be attenuated.

2. Description of the Prior Art

A previously proposed sensor arrangement is shown in FIGS. 1 and 2 of the drawings wherein a rotary element 1 is provided with a projection or marker 2 passing in close proximity of a stationary permanent magnet 3 about which a coil 4 is disposed. With this arrangement each time the marker 2 passes by the end of the permanent magnet 3, the change in magnetic flux induces an EMF in the coil 4. A typical output of the coil is depicted in FIG. 3. As shown in this figure the output takes the form of a sinusoidal wave having a peak value $V_{p-p}$, which, as shown in FIG. 4, increases proportionally with the rotational speed of the member on which the marker 2 is formed. The output is also inversely proportional to the distance "1". So that the marker is effectively juxtaposed at the end of the magnet in essentially a single position, it is preferable to have the end of the magnetic disposed at a distance "L" from the surface of the rotary member. However, in the crowded environment in which an automotive transmission fly wheel (for example) is disposed (see FIG. 6) it is usually impossible to provide the required spacing "L" and/or to avoid other protrusions or voids on the rotary member such as holes, bolt heads, ribs and the like which are apt to produce noise such as indicated by "b" in FIGS. 3, 4 and 5. Hence, it is necessary in actual practice to use circuitry which screens or filters out the noise. However, with such circuitry, if as shown in FIG. 5, the slice level (En) is set sufficiently low (for example at $E_{n1}$) to allow for positional detection at low RPM (e.g. $N_1$ in FIG. 4), as the RPM rises (for example to $N_2$ in FIG. 4) the level of the noise is apt to rise above the slice level, inducing erroneous position detection. Conversely, if the slice level is, as shown in FIG. 5, set high enough (for example at $E_{n2}$) to avoid this phenomenon, then at low RPM the signal "a" is apt not to rise above the slice level adequately to permit accurate position detection.

In an attempt to solve this problem it has been proposed to replace the marker with a permanent magnet and use a soft iron core in place of the magnet in the stationary "pick-up" of the position detector. While this has to some degree overcome the above mentioned problem, the permanent magnet is subject to rapid loss of magnetism due to direct contact with the rotary member (usually made of ferromagnetic metal), exposure to heat, vibration etc. An example of an arrangement of this nature is disclosed in Japanese Utility Model Provisional Publication No. 51-85769/1976.

SUMMARY OF THE INVENTION

The present invention features an arrangement wherein a permanent magnet is mounted on a rotary member via a non-magnetic holder which magnetically isolates the magnet from the rotary member and insulates the magnet from heat which might be conducted thereto through said rotary member so as to prolong life of the magnet almost indefinitely. Another feature of the present invention is that of covering the protruding end or ends of the magnet with a thin layer or cap of nonferromagnetic material to prevent the accumulation of small magnetic particles which might otherwise collect at the end of the magnet and interfere with the operation of the sensor.

BRIEF DESCRIPTION OF THE DRAWINGS

The features and advantages of the arrangement of the present invention will become more clearly appreciated from the following description taken in conjunction with the accompanying drawings in which.

DETAILED DESCRIPTION OF THE PREFERRED EMBODIMENTS

Figure 1:
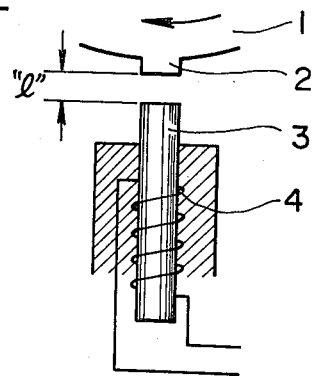
FIG. 1 is a schematic elevation of the prior art arrangement discussed above
Figure 2:
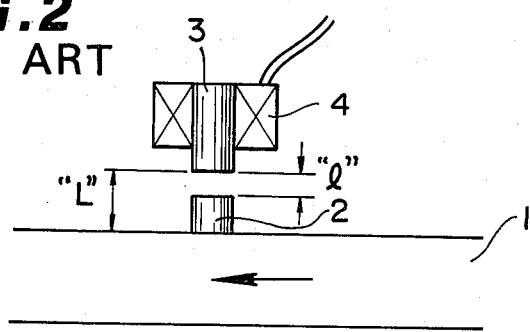
FIG. 2 is a schematic plan view of the arrangement shown in FIG. 1.
Figure 3:
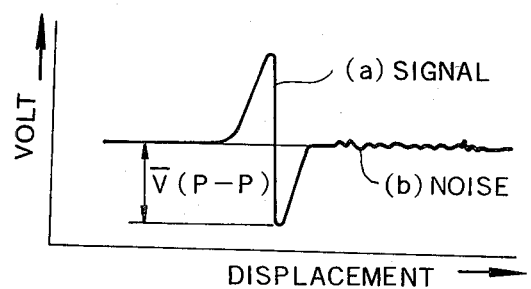
FIG. 3 is a graph showing in terms of output voltage and displacement of the marker with respect to the pickup, the output of the sensor arrangement illustrated in FIGS. 1 and 2.
Figure 4:
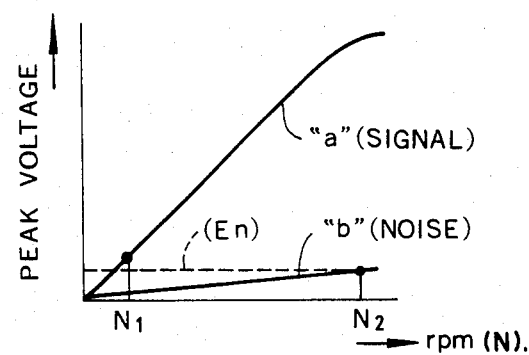
FIG. 4 is a graph showing in terms of peak output voltage and RPM (of the rotary member) the change in output of the sensor with respect to increasing rotational speed.
Figure 5:
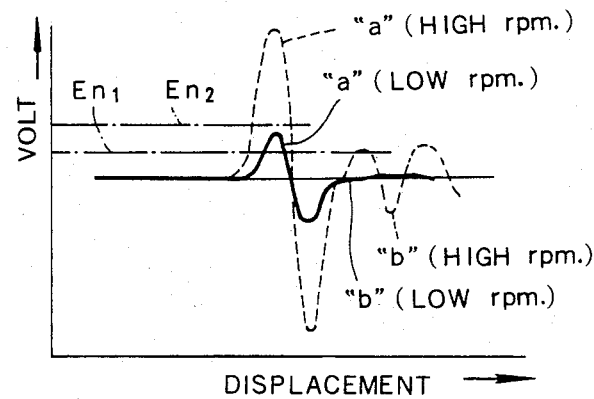
FIG. 5 is a graph showing in terms of voltage and displacement of the movable marker with respect to the pickup, the differences in sensor output at low and high RPM, highlighting the phenomenon experienced with the prior art wherein noise level at high RPM approximates the actual signal at low RPM.
Figure 6:
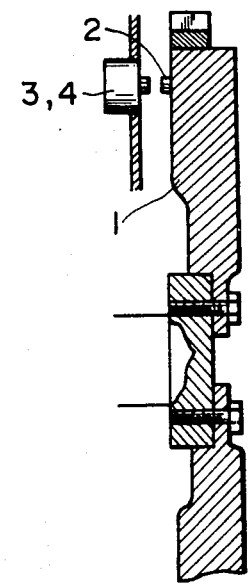
FIG. 6 is a sectional view of the prior art sensor (stationary pick-up and rotatable marker) mounted in a vehicle transmission.
Figure 7:
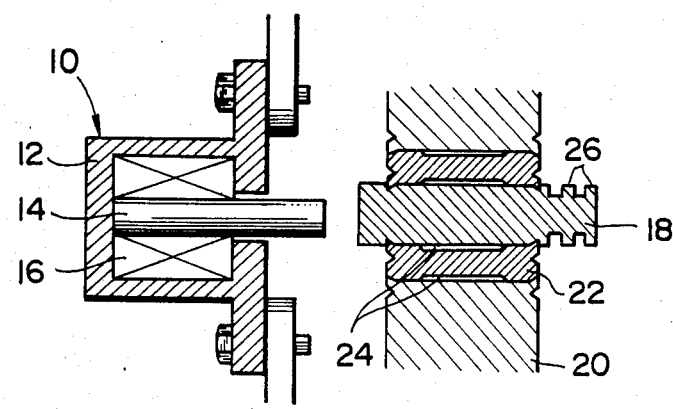
FIG. 7 is a sectional view of a first embodiment of the present invention.

In a first embodiment of the present invention FIG. 7 a stationary pickup 10 is secured to a suitable portion of a vehicle transmission or the like. Pickup 10 comprises a housing 12 containing therein a soft iron core 14 (or the like) about which a coil 16 is disposed. A permanent magnet 18 is mounted in a suitable bore formed in a rotary member 20 (such as the fly-wheel of a vehicle transmission) through an non-ferromagnetic holder 22. Holder 22 may be formed of any one of a number of nonmagnetic materials (e.g., brass). As shown, holder 22 is formed with annular recesses 24 on internal and external surfaces thereof to establish thermal insulating air layers. Holder 22 may be secured in rotary member 20 via either one or both of bonding and crimping. Cooling fins 26 are formed at one end of the magnet to permit any heat conducted to the magnet to be removed via flow of air thereover. Magnet 18 may be secured in holder 22 via crimping, bonding or both.

Figure 8:
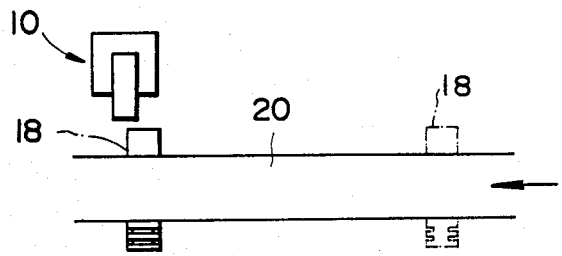
FIGS. 8 and 9 are schematic plan views of a sensor according to the present invention and a timing chart showing the output derived from the sensor, respectively.
Figure 9:
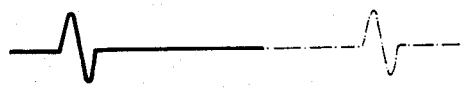

FIGS. 8 and 9 show the provision of one or more permanent magnets (the second is indicated in phantom) and the output obtained as the marker (magnet) or markers (magnets) pass by the pickup. As shown in FIG. 9 the output of the sensor pickup is essentially free of noise.

Figure 10:
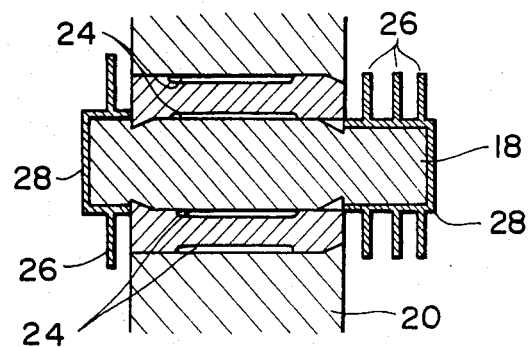
FIG. 10 is a sectional view of a second embodiment of the present invention.

FIG. 10 shows a second embodiment of the present invention. In this arrangement caps 28 are provided on the ends of the magnet protruding out of the rotary member. These caps are made of a non-ferromagnetic material formed with cooling fins 26. Caps 28 prevent magnetic dust or the like from adhering to the magnet and therefore prevent formation of a heat insulating layer or the like thereon.

Figure 11:
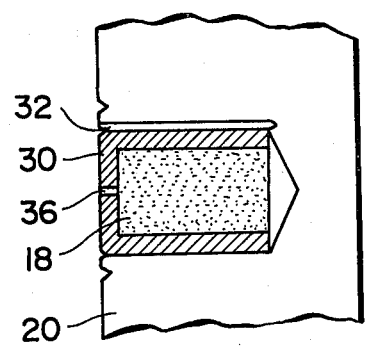
FIG. 11 is a sectional view of a third embodiment of the present invention.
Figure 12:
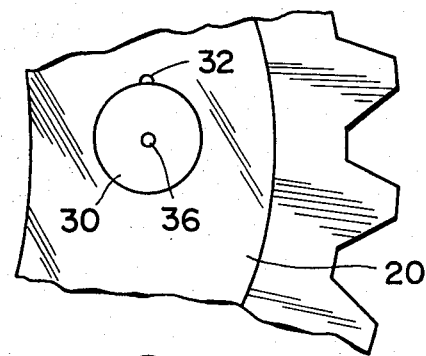
FIG. 12 is a front elevation of the arrangement shown in FIG. 11.
Figure 13:
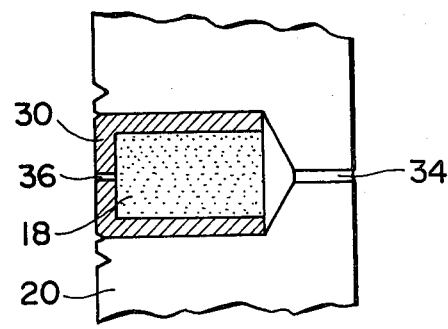
FIG. 13 is a sectional elevation of a variation of the arrangement shown in FIG. 11.

FIGS. 11 to 13 show a third embodiment of the present invention. In this arrangement permanent magnet 18 is disposed within a capsule-like holder 30 preferably made of aluminium. The capsule 30 is press fitted (and-/or bonded) in place in a suitable blind bore formed in the rotary member. To allow air and/or excess bond material to be discharged from the bore during assembly, a slit 32 may be provided as shown in FIGS. 11 and 12. Alternately, a small air passage 34 may be drilled through the rotary member as shown. To allow any air and/or bond to be displaced from within the capsule 30, a small air hole 36 may be formed in the end thereof as shown.

Even though the arrangement in FIGS. 11–13 is not finned, the life of the magnetic is prolonged almost indefinitely. Further, it has been found that this embodiment may be secured in place using only one of crimping or bonding without any detrimental long term effect.

With the present invention it is possible to set the slice level to a level where very low rotational speeds (for example down to 50 RPM) may be accurately detected. This of course permits the cranking speed of the engine to be accurately monitored during engine start-up. Other factors effecting the lower limit of accurate detection are of course the strength of the magnet, the distance between the end of the magnet and the soft iron core, the number of turns on the coil etc.

What is claimed is:

1. A position detector arrangement comprising:
   (a) a rotatable member;
   (b) a permanent magnet disposed in said rotatable member for synchronous rotation therewith;
   (c) a holder disposed about said magnet for magnetically and thermally isolating said magnet from said rotatable member; and
   (d) a pickup mounted on a member stationary with respect to said rotatable member for sensing passage of said permanent magnet past the pickup.

2. A position detector as claimed in claim 1, wherein said magnet and said holder are disposed in a through bore formed in said rotary member, said magnet protruding from either side of said rotary member.

3. A position detector as claimed in claim 1, wherein said holder is formed with a recess establishing a thermal insulating air layer between the holder and said rotary member.

4. A position detector as claimed in claim 2, further comprising a non-magnetic cap disposed on each end of said magnet to prevent accumulation of magnetic matter thereon.

5. A position detector as claimed in claim 1, wherein said holder is a capsule-like member disposed in a blind bore formed in said rotary member.

6. A position detector as claimed in claim 5, wherein at least one of said capsule-like member and said rotary member is formed with an air-hole for venting air or excess bond material through the hole during assembly of said capsule member to the rotary member.

7. A position detector as claimed in claim 2, further comprising cooling fins formed on said magnet.

8. A position detector arrangement as claimed in claim 1, further comprising a non-magnetic cap disposed directly on said magnet to prevent accumulation of magnetic matter thereon.

9. The detector of claim 4, further comprising cooling fins formed on said non-magnetic cap.

10. In a position detector arrangement including a rotatable member and a stationary pickup disposed adjacent said rotatable member;
    means defining an aperture in said rotatable member;
    a holder disposed in said aperture, said holder being formed of a non-magnetic material; and
    a permanent magnet disposed in said holder so as to be magnetically and thermally insulated from said rotatable member.

11. A position detector arrangement, comprising:
    (a) a rotatable member formed with a throughbore on the periphery thereof;
    (b) a permanent magnet disposed in said rotatable member for synchronous rotation therewith, said magnet having opposite ends projecting outwardly from the throughbore, and cooling fins formed on one end of the magnet;
    (c) a holder disposed about said magnet for magnetically and thermally isolating said magnet from said rotatable member, said holder being an annular cylinder member formed with annular recesses on inner and outer walls thereof to establish thermal air insulating layers between the holder and rotatable member and between the magnet and holder; and
    (d) a pickup mounted on a member stationary with respect to said rotatable member for sensing passage of said permanent magnet past the pickup, wherein said one end of the magnet faces away from the pickup.

12. A position detector arrangement, comprising:
    (a) a rotatable member formed with a throughbore on the periphery thereof;
    (b) a permanent magnet disposed in said rotatable member for synchronous rotation therewith, said magnet having opposite ends projecting outwardly from the throughbore;
    (c) a holder disposed about said magnet for magnetically and thermally isolating said magnet from said rotatable member, said holder being an annular cylindrical member formed with annular recesses on inner and outer walls thereof to establish thermal air insulating layers between the holder and rotatable member and between the magnet and holder; and
    (d) a pickup mounted on a member stationary with respect to said rotatable member for sensing passage of said permanent magnet past the pickup; and
    (e) a non-magnetic cap disposed on each end of said magnet to prevent accumulation of magnetic matter thereon, each cap having cooling fins thereon.

13. A position detector arrangement, comprising:

(a) a rotatable member formed with a blind hole on the periphery thereof;

(b) a permanent magnet disposed in the blind hole, said magnet being encased within a capsule like member having side walls that magnetically and thermally isolate the magnet from the rotatable member; and (d) a pickup mounted on a member stationary with respect to said rotatable member for sensing passage of said permanent magnet past the pickup.

* * * * *